No. 855,596. PATENTED JUNE 4, 1907.
T. J. THORP.
AGRICULTURAL MACHINE.
APPLICATION FILED MAY 11, 1906.

8 SHEETS—SHEET 1.

Witnesses:
W. H. Cotton
J. H. Landes

Inventor:
Thomas J. Thorp
By
Att'ys.

No. 855,596. PATENTED JUNE 4, 1907.
T. J. THORP.
AGRICULTURAL MACHINE.
APPLICATION FILED MAY 11, 1906.

8 SHEETS—SHEET 3.

Witnesses:
W. H. Cotton
J. H. Landes

Inventor.
Thomas J. Thorp.
By Dynforth, Dynforth, Lee & Miles Att'ys

No. 855,596. PATENTED JUNE 4, 1907.
T. J. THORP.
AGRICULTURAL MACHINE.
APPLICATION FILED MAY 11, 1906.

8 SHEETS—SHEET 4.

Witnesses.
W. H. Collin
J. H. Landers

Inventor.
Thomas J. Thorp
By Dyrenforth, Dyrenforth, Lee & Wills,
Att'ys

No. 855,596. PATENTED JUNE 4, 1907.
T. J. THORP.
AGRICULTURAL MACHINE.
APPLICATION FILED MAY 11, 1906.
8 SHEETS—SHEET 5.
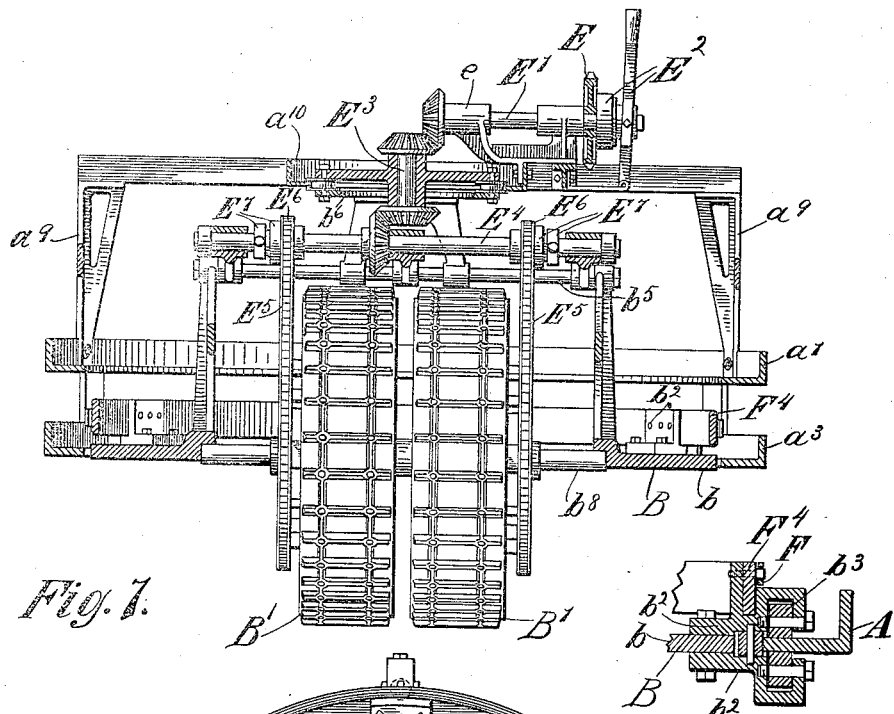
Fig. 7.
Fig. 8.
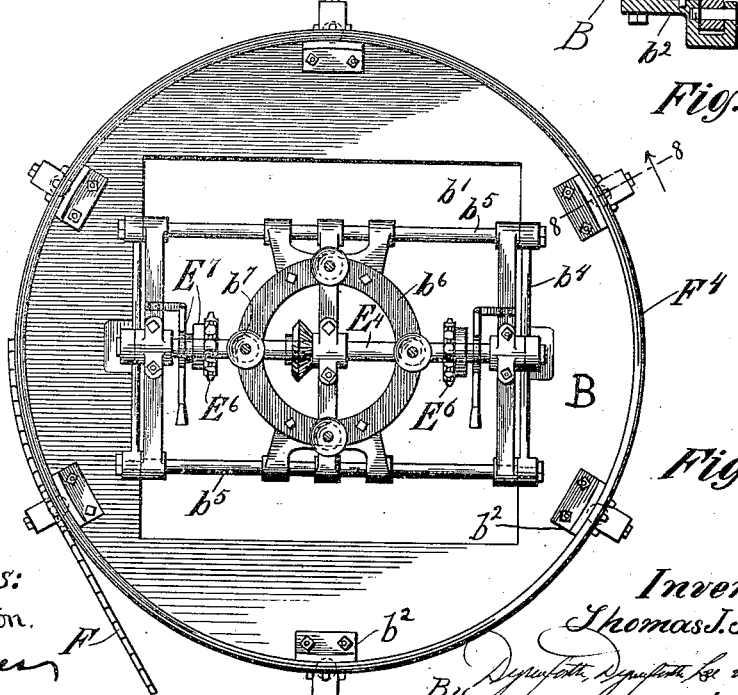
Fig. 9.
Witnesses:
W. H. Cotton.
J. H. Landers.
Inventor:
Thomas J. Thorp.
By
Attys.

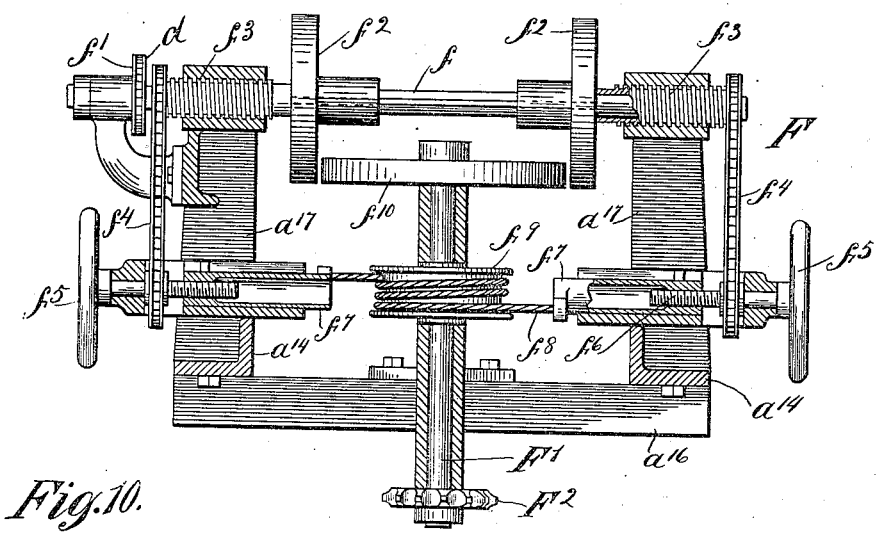

No. 855,596. PATENTED JUNE 4, 1907.
T. J. THORP.
AGRICULTURAL MACHINE.
APPLICATION FILED MAY 11, 1906.
8 SHEETS—SHEET 7.
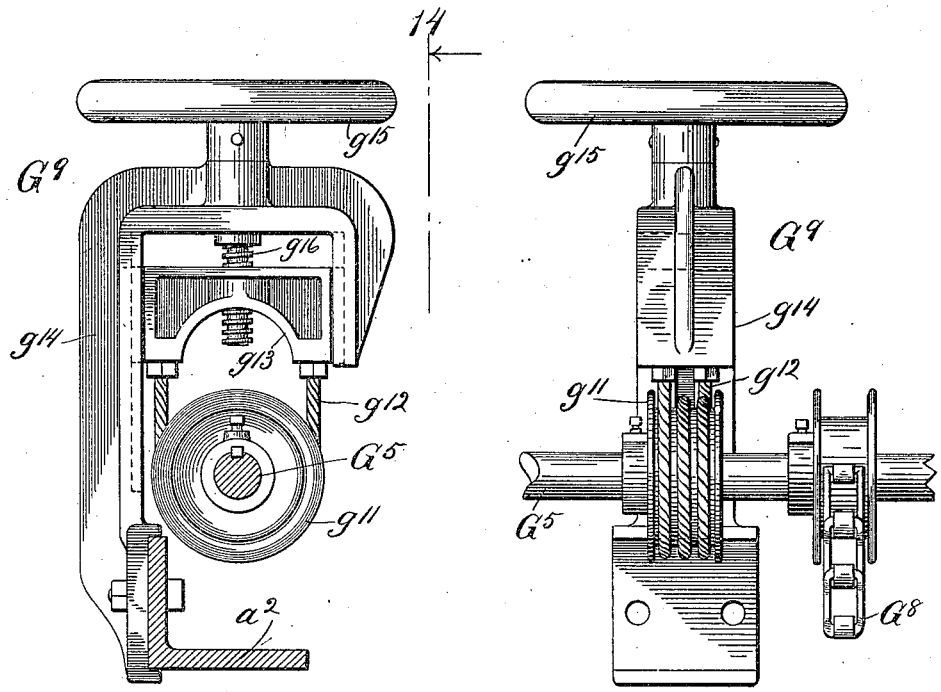
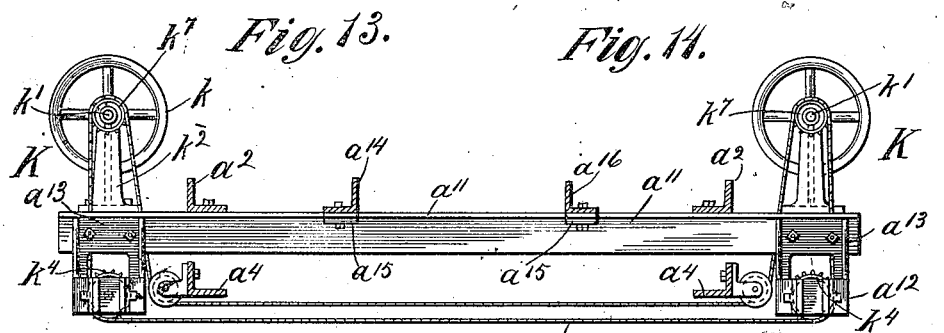
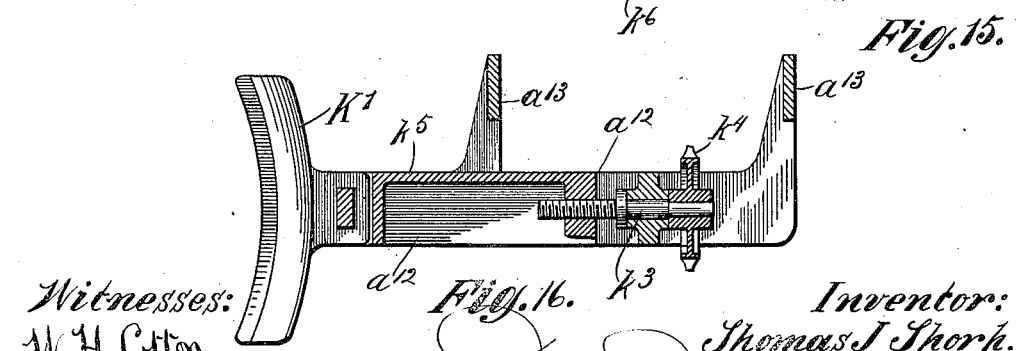
Witnesses:
W. H. Cotton
J. H. Landes
Inventor:
Thomas J Thorp.
By Dynenforth, Dynenforth, Lee & Wiles,
Attys.

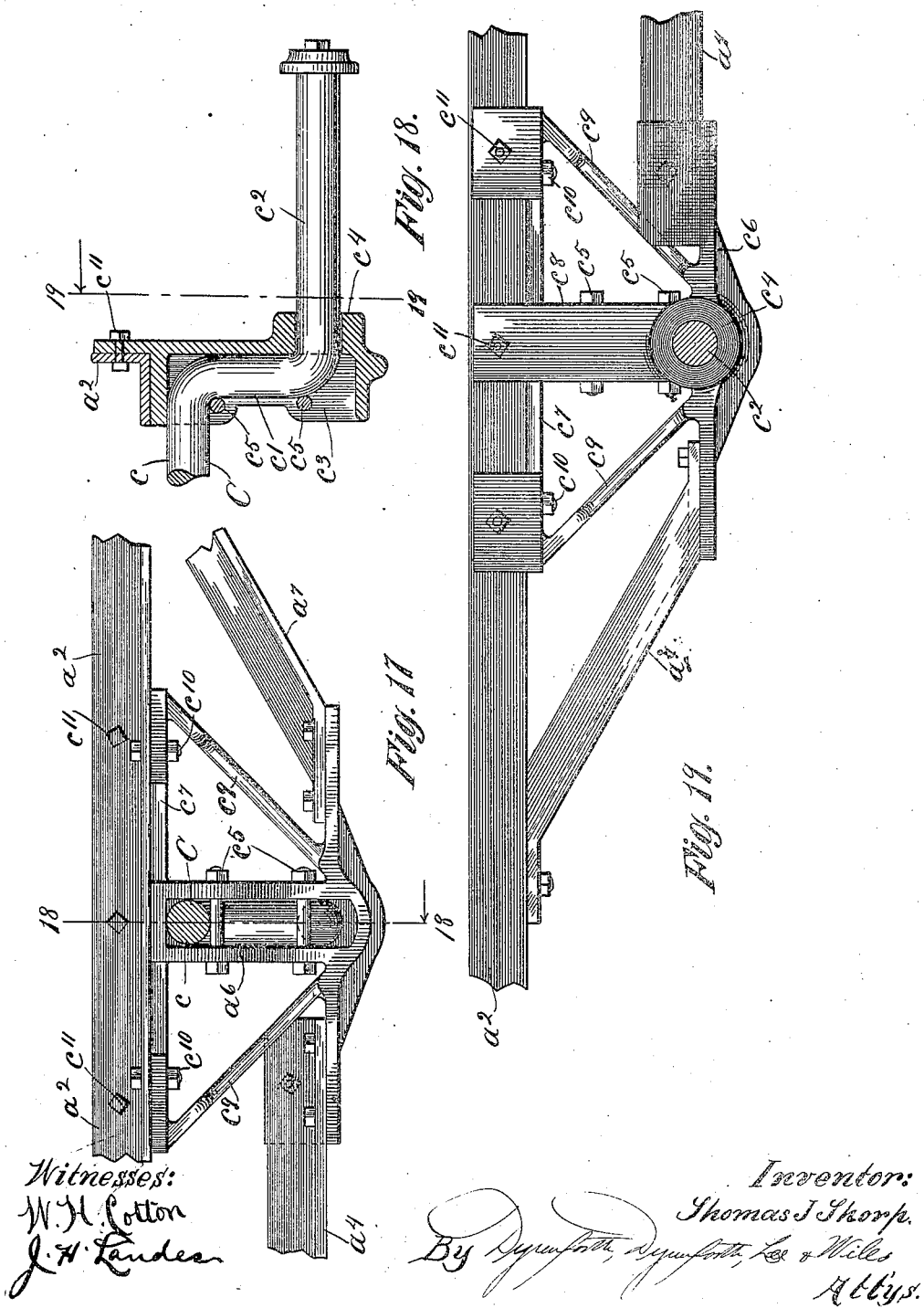

UNITED STATES PATENT OFFICE.

THOMAS J. THORP, OF CORVALLIS, OREGON, ASSIGNOR TO T. J. THORP MFG COMPANY, OF CORVALLIS, OREGON, A CORPORATION OF OREGON.

AGRICULTURAL MACHINE.

No. 855,596.  Specification of Letters Patent.  Patented June 4, 1907.

Application filed May 11, 1906. Serial No. 316,310.

*To all whom it may concern:*

Be it known that I, THOMAS J. THORP, a citizen of the United States, residing at Corvallis, in the county of Benton and State of Oregon, have invented a new and useful Improvement in Agricultural Machines, of which the following is a specification.

My invention relates particularly to self-propelled agricultural machines; and my primary object is to provide a strong, powerful and durable machine particularly adapted to the purpose of plowing, harrowing and seeding.

The invention is illustrated in its preferred embodiment in the accompanying drawings, in which—

Figure 1:
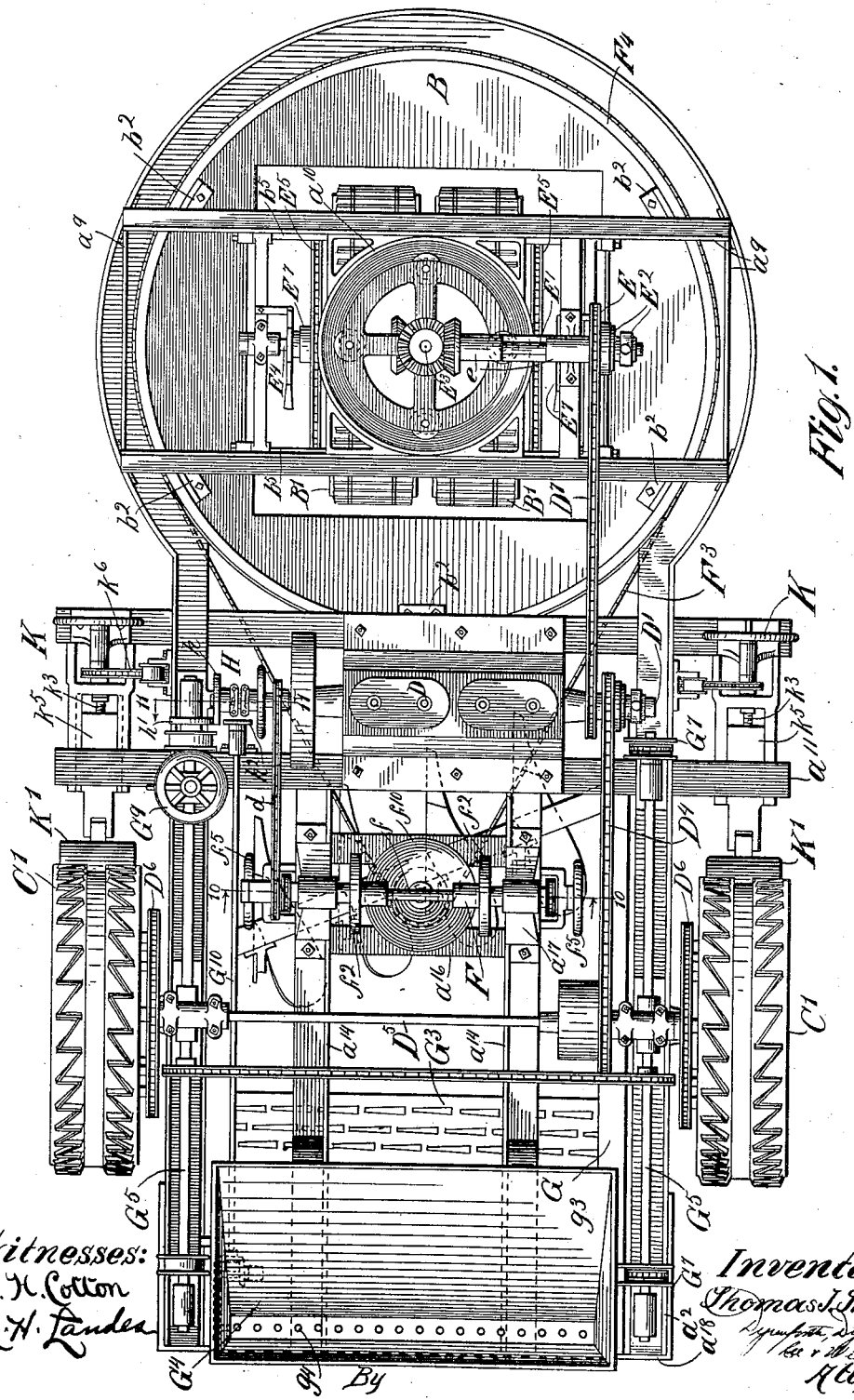
Figure 2:
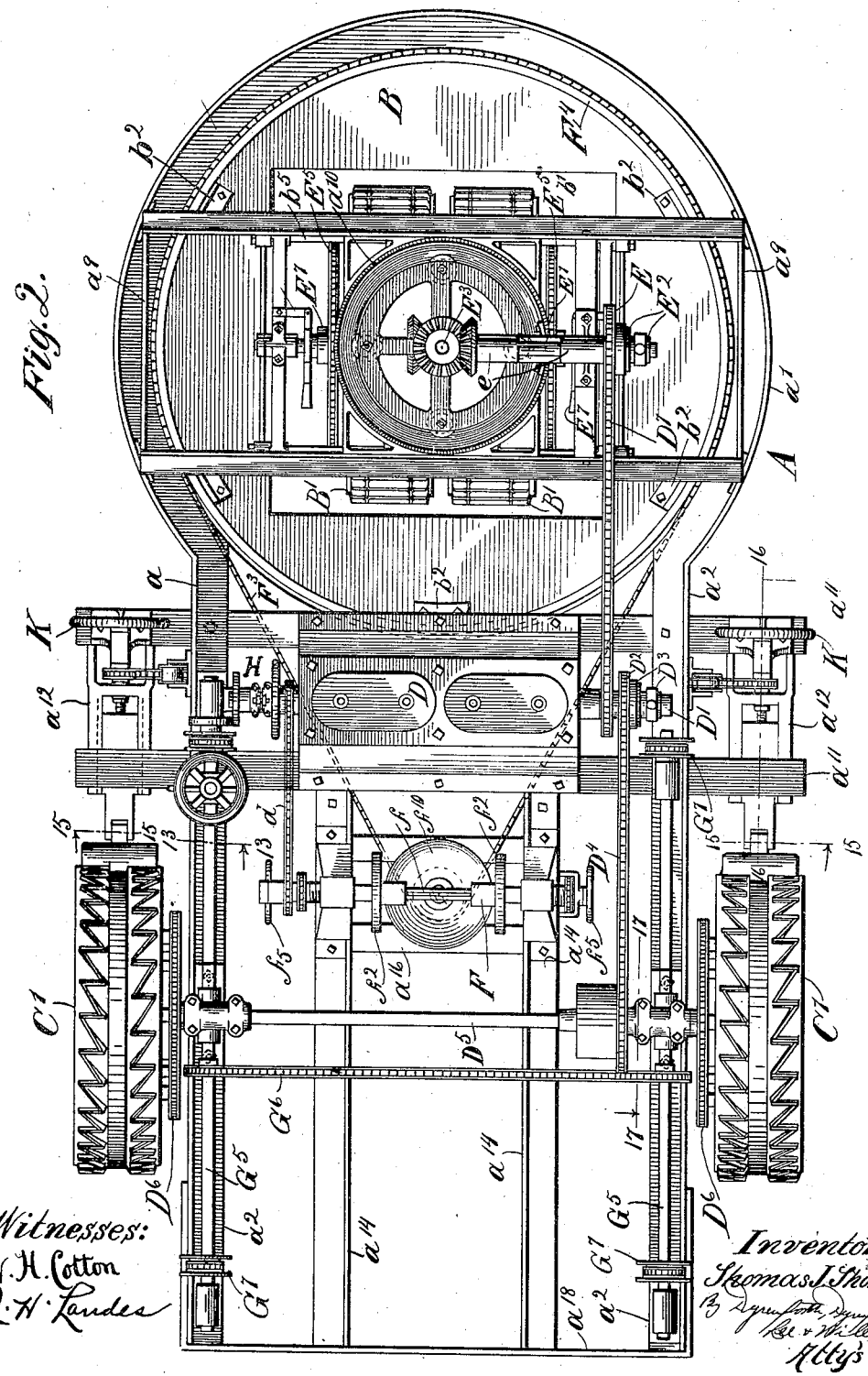
Figure 3:
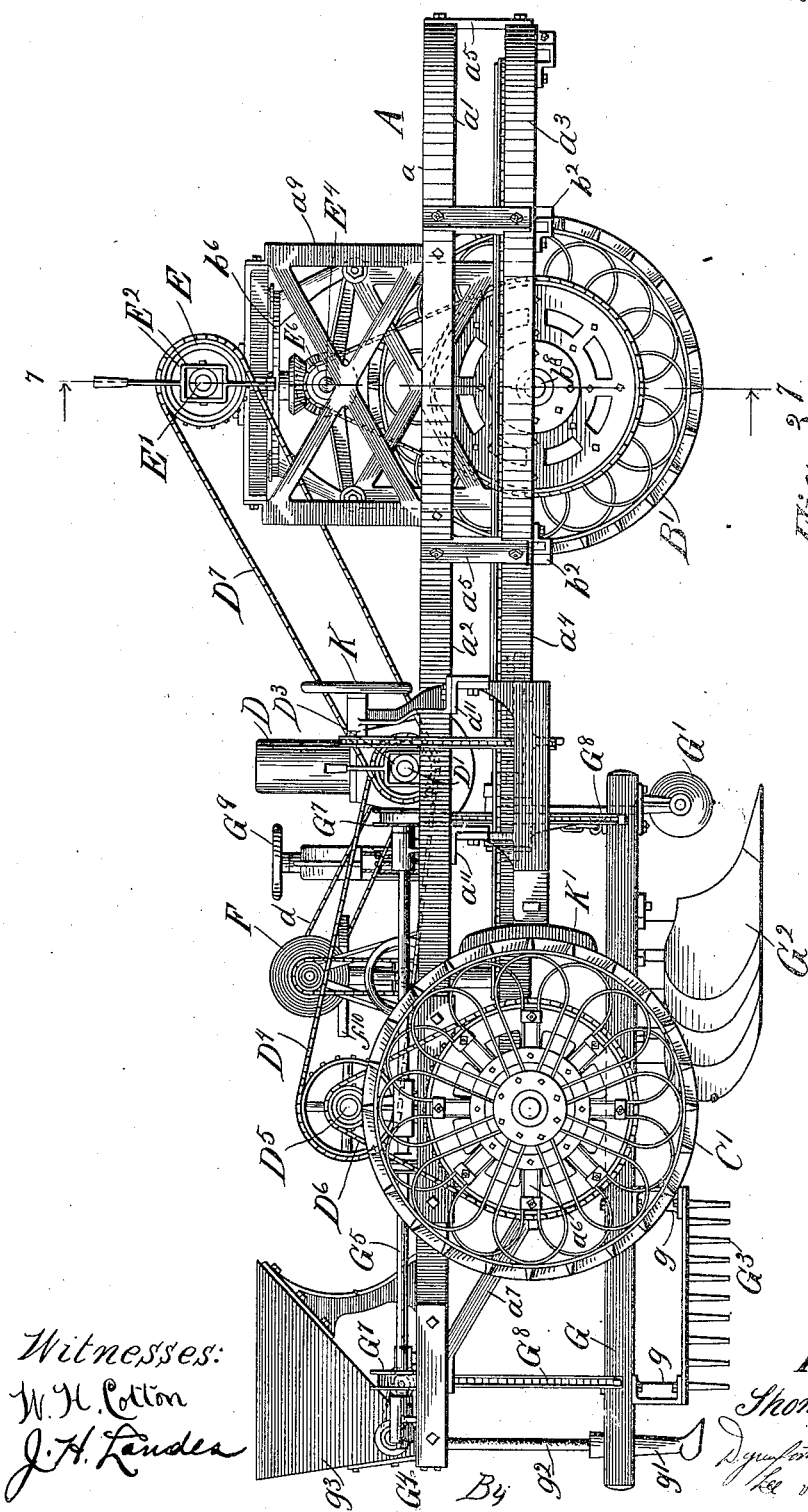
Figure 4:
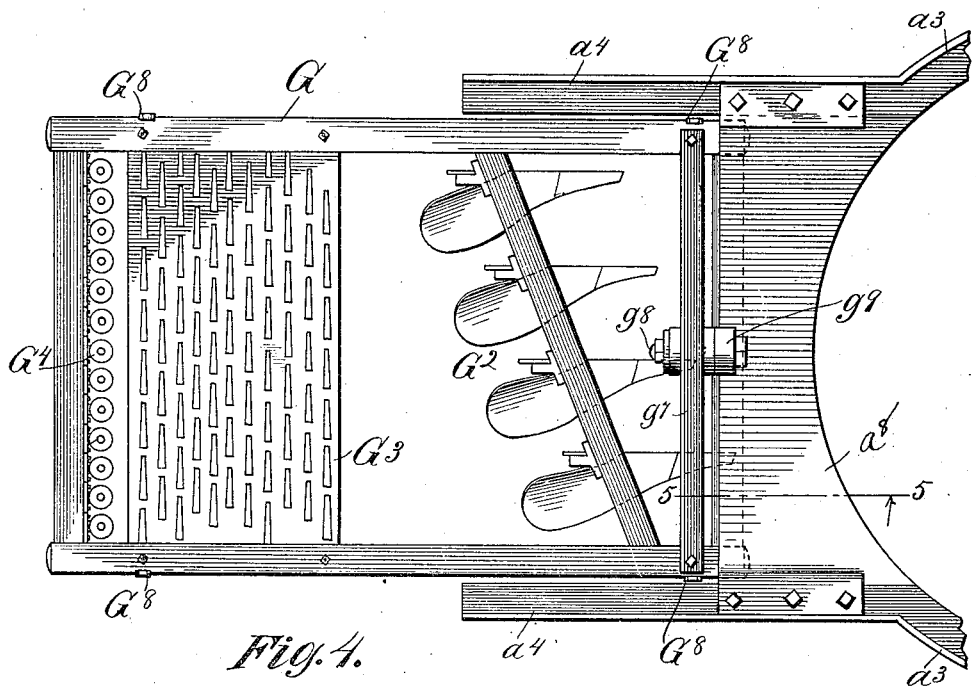
Figure 5:
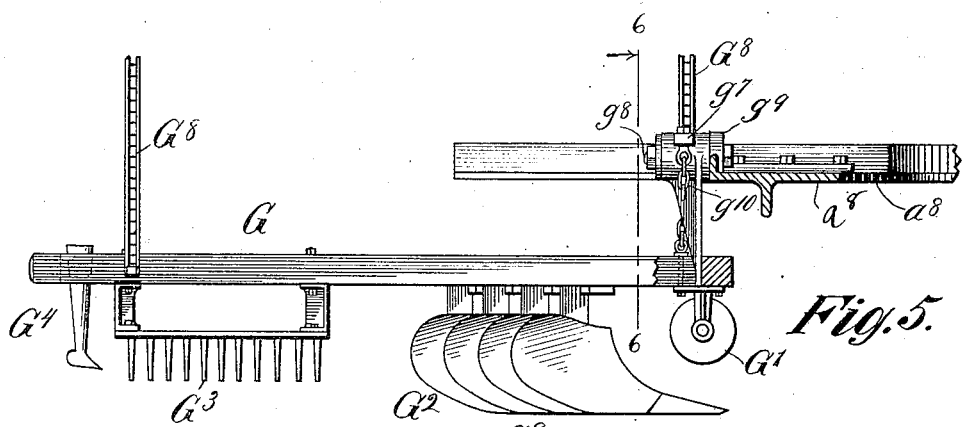
Figure 6:
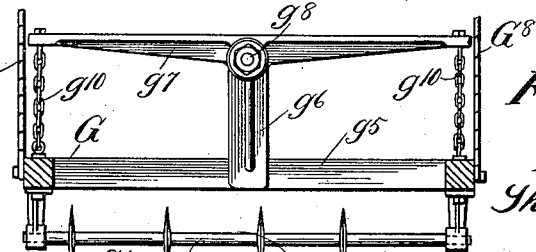

Figure 1 represents a plan view of a combination plowing, harrowing and seeding machine constructed in accordance with my invention; Fig. 2, a similar view with certain of the parts removed; Fig. 3, a side elevational view of the machine; Fig. 4, a plan view of the main frame and the auxiliary frame; Fig. 5, a longitudinal sectional view taken as indicated at line 5 of Fig. 4; Fig. 6, a transverse sectional view taken as indicated at line 6 of Fig. 5; Fig. 7, a vertical sectional view taken as indicated at line 7 of Fig. 3; Fig. 8, a detail sectional view taken as indicated at line 8 of Fig. 9; Fig. 9, a plan view of a turn-table supported by the front wheels and adapted to turn with relation to the main frame, the front end of which it supports; Fig. 10, a sectional view taken as indicated at line 10 of Figs. 1 and 3, and showing details of construction of the steering mechanism employed; Fig. 11, a broken sectional view taken as indicated at line 11 of Fig. 1 and showing details of the mechanism for operating the seeder and raising and lowering the auxiliary frame; Fig. 12, a plan view of the mechanism shown in Fig. 11; Fig. 13, a section taken as indicated at line 13 of Fig. 2 and showing a device employed for regulating the descent of the auxiliary frame; Fig. 14, a view of the device shown in Fig. 13, the view being taken as indicated at line 14 of Fig. 13; Fig. 15, a section taken as indicated at line 15 of Fig. 2 and showing a detail of the brake mechanism for the traction-wheels of the machine; Fig. 16, a section taken as indicated at line 16 of Figs. 2 and 15; Fig. 17, a section taken as indicated at line 17 of Fig. 2, and showing a detail of construction at the rear axle; Fig. 18, a section taken as indicated at line 18 of Fig. 17; and Fig. 19, a section taken as indicated at line 19 of Fig. 18.

In the preferred construction, A represents the main frame of the machine; B, a turn-table supported by a pair of front wheels $B^1$, and, in turn, supporting the front end of the main frame; C, a rear axle upon the spindles of which are journaled the rear wheels $C^1$; D, an engine mounted on the main frame and having a shaft $D^1$ equipped with a sprocket-wheel $D^2$ controlled by a clutch $D^3$; $D^4$, a sprocket-chain serving to communicate motion from the sprocket-wheel $D^2$ to a transverse shaft $D^5$ journaled on the main frame above the axle, the shaft $D^5$ being connected by sprocket-chains $D^6$ and suitable sprocket-wheels to the rear wheels $C^1$ of the machine; $D^7$, a sprocket-chain connected with the engine-shaft and serving to actuate a sprocket-wheel E mounted on a transverse shaft $E^1$ controlled by a clutch $E^2$, the shaft $E^1$ being mounted upon a suitable standard supported on the front end of the main frame; $E^3$, a vertical shaft coincident with the axis of the turn-table B and connected by bevel gears with the shaft $E^1$; $E^4$, a transverse shaft journaled on suitable standards with which the turn-table B is equipped and connected by bevel gears with the shaft $E^3$; $E^5$, sprocket-chains connecting the front wheels of the machine with sprocket-wheels $E^6$ journaled on the shaft $E^4$ and controlled by clutches $E^7$; F (Figs. 1 and 10), steering mechanism comprising as a part thereof a vertical shaft $F^1$ equipped with a sprocket-wheel $F^2$ serving to actuate a sprocket-chain $F^3$ passing about a suitable toothed member $F^4$ (Fig. 8), whereby the turn-table is turned as desired in steering the machine; G, an auxiliary tool-frame vertically adjustable with relation to the main frame and equipped in order from front to rear with colters $G^1$, plows $G^2$, a harrow $G^3$, and a seeder $G^4$; $G^5$, a pair of longitudinal shafts connected by a sprocket-chain $G^6$ and equipped with wheels $G^7$ with which are connected chains $G^8$ by means of which the frame G is suspended; $G^9$ (Figs. 1, 3, 13 and 14), a gripping or locking device connected with one of the shafts $G^5$ and serving to control the descent of the auxiliary frame and to lock the frame in any desired position with relation to the main frame; $G^{10}$, a shaft serving to actuate the dropper of the seeder; H (Figs. 1, 11 and 12), mechanism whereby power may be transmitted at will to either the dropper actuating shaft $G^{10}$ or the adjacent one of the tool-frame adjusting shafts $G^5$; and K (Figs. 3, 15 and 16), mechanism controlling brakes $K^1$ with which the rear wheels of the machine are fitted.

The main frame is shown as comprising an upper angle-bar $a$ bent intermediately to form a portion of a circle $a^1$, and straight side members $a^2$ extending rearwardly therefrom; a lower frame member comprising an angle-bar bent intermediately to form a portion of a circle $a^3$, and straight side members $a^4$ extending rearwardly therefrom; vertical members $a^5$ connecting the upper and lower frame members mentioned; brackets $a^6$ connecting the upper and lower frame members at the rear ends of the members $a^4$, as shown in Fig. 17, the brackets serving also as a means of connection with the axle; brace-members $a^7$ connecting the rear ends of the bracket-members $a^6$ with the rear portions of the members $a^2$, as shown in Fig. 3; a plate $a^8$ (Figs. 4 and 5) forming a connecting member between the members $a^4$ and serving to complete the circle $a^3$; a standard $a^9$ (Figs. 1, 3 and 7) firmly secured to the circle $a^1$ of the upper frame member and supporting the shaft $E^1$, said standard supporting a circle $a^{10}$ having its axis coincident with the axis of the vertical shaft $E^3$; cross-members $a^{11}$ firmly connected with the members $a^2$, as shown in Figs. 3 and 15, said cross-members serving to support the engine and portions of the wheel-brakes, as indicated in Figs. 1, 2 and 3; longitudinal guide-members $a^{12}$ having connecting arms $a^{13}$ joined to the cross-members $a^{11}$, as shown in Figs. 3, 15 and 16, said guides serving to receive the slides carrying the brake-shoes $K^1$; a pair of longitudinal angle-bars $a^{14}$ connected at their front ends by brackets $a^{15}$ with the rear one of the cross-members $a^{11}$, as shown in Fig. 15; a cross-member $a^{16}$ supported on the members $a^{14}$ and serving to support portions of the mechanism F, as shown in Fig. 10; standards $a^{17}$ supported on the members $a^{14}$ and serving to support a shaft of the mechanism F; and a rear frame member $a^{18}$ firmly joined to the rear ends of the members $a^2$ and $a^{14}$.

The turn-table, or front wheel-frame, B comprises a disk $b$ having its central portion cut away as indicated at $b^1$ to accommodate the front wheels; a series of brackets $b^2$ firmly secured to the peripheral portion of the disk $b$ and equipped with rollers $b^3$ (Fig. 8); a ring $F^4$ equipped with teeth and forming a part of the steering mechanism F, said ring comprising a flat band of steel bent into circular form and provided with teeth for engaging the sprocket-chain $F^3$; and a standard $b^4$ having cross shafts $b^5$ supporting a head $b^6$ (Fig. 9) equipped with grooved rollers $b^7$ which work on the circular track $a^{10}$, as shown in Fig. 7. The standard $b^4$ affords bearings for the transverse shaft $E^4$ which passes beneath the head $b^6$. The wheels $B^1$ are journaled on the shaft $b^8$ which supports the wheel-frame B. The wheels are located on opposite sides of the longitudinal center of the machine, and have their hubs connected by the sprocket-chains $E^5$ with the sprocket-wheels controlled by the clutches $E^7$. Thus, either one or both of the front wheels may be actuated at will.

The rear axle C has a body-portion $c$, vertical portions $c^1$ and spindles $c^2$, the body-portion lying above the spindles. The brackets $a^6$ are formed with vertical channels $c^3$ which receive the vertical portions of the axle, and openings $c^4$ through which the spindles project. The vertical portions of the axle are confined within said channel by bolt $c^5$. The brackets are applied from the outer ends of the spindles, as will be readily understood from Figs. 17, 18 and 19. Each bracket comprises a lower horizontal member $c^6$, whose ends are joined to the frame-members $a^4$, $a^7$; an upper horizontal member $c^7$; a vertical connecting member $c^8$ in which the channel $c^3$ is formed; and an inclined brace-member $c^9$ extending from the ends of the members $c^7$ to intermediate portions of the member $c^6$. The upper portion of the bracket is joined by vertical bolts $c^{10}$ and horizontal bolts $c^{11}$ to the corresponding member $a^2$, the upper portion of the bracket being flanged to conform to the angle bar of the member $a^2$. The wheels are of a special construction not claimed in the present application, and details of which need not be here explained.

The engine D may be of any suitable construction. Its shaft $D^1$ serves to continuously operate the sprocket-chain $D^7$ and a sprocket-chain $d$ connected with a shaft of the mechanism F, which will be presently described. The means for transmitting motion from the continuously rotating sprocket wheel E actuated by the sprocket-chains $D^7$ will be readily understood by reference to Fig. 7. The shaft $E^1$ is supported in a bearing $e$ carried by the standard $a^9$. The shaft $E^3$ is in alinement with the vertical axis of the rotatable wheel-frame B, so that the motion can be communicated to the shaft $E^4$ which serves to actuate the front wheels, regardless of the position of the wheel-frame in the steering operation.

The mechanism F comprises (Fig. 10) a continuously rotating shaft $f$ which is actuated through the medium of a sprocket-wheel $f^1$ with which the sprocket-chain $d$ connects; a pair of friction disks $f^2$ splined on the shaft $f$ and capable of being shifted longitudinally of the shaft by screws $f^3$ connected with the standards $a^{17}$, which may be actuated by sprocket-wheels $f^4$ connected with hand-wheels $f^5$. The hand-wheels have threaded stems $f^6$ connected with slides $f^7$ joined to the opposite ends of a cable $f^8$ which passes about a sheave $f^9$ secured on the steering shaft $F^1$. The upper end of the shaft $F^1$ is equipped with a friction disk $f^{10}$ which is located between the two friction disks $f^2$. When the slides $f^7$ are most widely separated, the cable $f^8$ firmly grips the sheave $f^9$, thereby locking the steering shaft $f^1$ against rotation. At will, however, either one of the hand-wheels $f^5$ may be actuated to move its slide and causes the cable to relax its grip, and simultaneously therewith bring one of the disks $f^2$ into engagement with the disk $f^{10}$, thereby causing the steering shaft to be actuated. It is obvious that the machine may be steered in either direction, according to which of the disks $f^2$ is moved into engagement with the disk $f^{10}$. It may be further remarked at this point that traction power may be applied to either of the front wheels of the machine to enable the machine to be turned with greater certainty from its course in case of emergency.

The auxiliary frame, or tool-frame, G is preferably of the rectangular form shown, and is suspended by connection near its four corners with the chains $G^8$. The colters $G^1$, it will be understood, are arranged in front of the dividing edges of the plows in a manner which will be readily understood. The plows $G^2$ are fixedly secured to the frame G in any suitable manner. Likewise, the harrow $G^3$ is fixedly secured to the frame, as by hangers $g$. The seeder comprises hollow shoes $g^1$ fixedly secured to the frame G; tubes $g^2$ telescopically connected with said shoes; a hopper $g^3$; and a dropper $g^4$ in the bottom of said hopper, operating upon a well known principle, said dropper being connected in any suitable manner with the actuating shaft $G^{10}$, which serves to operate it. The harrow may be of any suitable construction. I have shown it formed of sheet-metal in accordance with the construction described and claimed in my application, No. 313,336 filed Apr. 23, 1906, (Pat. No. 832,350). As shown in detail in Figs. 4, 5 and 6, the frame G has a front bar $g^5$ which is engaged centrally by a depending bracket-arm $g^6$ forming a portion of a lever $g^7$ connected by a longitudinal horizontal pivot $g^8$ with a lug $g^9$ with which the plate $a^8$ of the main frame is provided. The ends of the bar $g^7$ are joined by flexible members $g^{10}$ to the front corners of the frame G. It will now be understood that the bar $g^7$ may turn upon its swivel when the frame G is tilted, or the frame may tilt with relation to the bracket $g^6$. In any case, a substantially horizontal draft will be imparted to the tool-frame G through the medium of the bracket $g^6$. In the operation of raising the tool-frame, the front bar $g^5$ slides upwardly with relation to the bracket $g^6$, as will be readily understood.

The height of the tool-frame, and consequently the depth of cut of the tools is regulated by the chains $G^8$ on which the tool-frame is suspended.

The mechanism $G^9$ by means of which the tool-frame is secured at any desired height, or allowed to descend under control, will be understood by reference to Figs. 13 and 14. It comprises a sheave $g^{11}$ fixed on one of the shafts $G^5$ and about which passes a cable $g^{12}$ whose ends are connected to a slide $g^{13}$ vertically movable in a guide $g^{14}$; and a hand-wheel $g^{15}$ connected with a screw $g^{16}$ which serves to actuate the slide $g^{13}$. It will be understood that by this mechanism the shaft $G^5$ may be gripped with any desired force, thereby to prevent or control its rotation.

The mechanism H which serves in the operation of raising the tool-frame and which serves also in the actuation of the dropper-slide of the seeder, will best be understood by reference to Figs. 11 and 12. It comprises a shiftable friction disk $h$ mounted on one end of the engine-shaft $D^1$; a friction disk $h^1$ secured on the adjacent shaft $G^5$; a friction disk $h^2$ secured on the shaft $G^{10}$, the disk $h$ being between the peripheries of the disks $h^1$, $h^2$; and a sleeve $h^3$ having threaded connection with a bracket $h^4$ supported on the adjacent frame $a^2$, the sleeve $h^3$ being equipped with a hand-wheel $h^5$. The sleeve $h^3$ serves to actuate a yoke, or ring, $h^6$ which has flanged connection with the hub of the disk $h$, said ring $h^6$ being secured against rotation by a stud $h^7$ working in the perforation in the upper end of the bracket $h^4$. It will be obvious that when the disk $h$ is shifted into contact with the disk $h^1$, the shaft $G^5$ will be actuated to raise the tool-frame; and when the disk $h$ is shifted into contact with the disk $h^2$, the shaft $G^{10}$ will be actuated to operate the movable member, or dropper, of the seeder.

The brake mechanism comprises a pair of hand-wheels $k$ secured to short longitudinal shafts $k^1$ mounted in standards $k^2$ on opposite ends of the front one of the cross-members $a^{11}$ of the frame; a pair of screws $k^3$ journaled in suitable bearings with which the guides $a^{12}$ are provided and equipped with sprocket-wheels $k^4$; slides $k^5$ mounted in the guides $a^{12}$ and carrying the brake-shoes $K^1$; and a sprocket-chain $k^6$ passing about the sprocket-wheels $k^4$ and about sprocket-wheels $k^7$ with which the shafts $k^1$ are equipped. It will thus be understood that when either one of the hand-wheels $k$ is actuated, the brake-shoes will be moved into or out of engagement with the rear wheels of the machine, according to the direction of movement of the hand-wheel.

The manner of operation of the machine will be readily understood. The engine-shaft operates to turn the sprocket-chains $D^7$ and $d$ continuously; and, if the clutch $E^2$ be in operative engagement, the shaft E¹ will communicate motion to the transverse shaft E⁴ mounted on the rotatable wheel-frame supported on the front wheels of the machine. By means of the clutches E⁷, one or both of the front wheels of the machine may be caused to operate for traction purposes. Power may be communicated at will from the engine-shaft to the shaft D⁵ through the medium of the clutch D¹, to cause the rear wheels of the machine to operate for traction purposes. When it is desired to lower the tool-frame, the hand-wheel g¹⁵ is turned to release the grip of the cable g¹² upon the shaft G⁵ with which it is connected, thereby allowing the tool-frame to be lowered under control. The seeder may be set in operation by operating the hand-wheel h⁵ in such manner as to bring the disk h on the engine-shaft into engagement with the disk h² on the dropper-actuating shaft of the seeder. When it is desired to raise the tool-frame preparatory to turning the machine about, the disk h may be moved in the other direction, thereby stopping the operation of the seeder and setting the shaft G⁵ in motion, thereby causing the chains G⁸ to wind upon the wheels G⁷ and elevate the tool-frame. The tool-frame may be locked in the elevated position by means of the gripping device G⁹. For ordinary purposes, the turning of the machine may be effected by actuating one or the other of the hand-wheels f⁵ of the steering mechanism F, according to the direction in which it is desired to turn. Ordinarily, the hand-wheels f⁵ are so set as to lock the steering shaft F¹ against movement when the machine will be caused to pursue a straight course. In emergency, one or the other of the front traction-wheels may be employed to aid in turning the machine sharply to one side for the purpose of getting out of a difficult place; or, if desired, both front wheels may be employed as traction-wheels to aid the rear wheels in propelling the machine over a difficult place.

The invention has been described in detail for clearness of understanding, and no undue limitation is to be understood therefrom.

What I regard as new, and desire to secure by Letters Patent, is—

1. The combination of a main frame, a wheel-frame on which the front end of the main frame is mounted to turn, a traction-wheel supporting said wheel-frame, a shaft having its axis coincident with the axis of said wheel-frame, means for communicating motion from said shaft to said wheel, a motor supported on the main frame, and means for communicating motion from said motor to said shaft.

2. The combination of a traction-wheel and its frame, a main frame with relation to which the first-named frame may turn, traction wheels supporting the main frame in the rear of the said first-named traction-wheel, a shaft serving to communicate motion to the first-named traction wheel and having its axis coincident with the axis of said traction-wheel frame, a motor mounted on the main frame, and means for communicating motion from said motor to said shaft and from said motor to the rear traction-wheels, for the purpose set forth.

3. The combination of a traction-wheel frame, a pair of traction wheels located on opposite sides of the axis thereof, a main frame having its front end supported on said traction-wheel frame and with relation to which the first-named frame may turn, a pair of rear wheels, a motor mounted on the main frame, and means for communicating motion from the motor to one or both of the front traction-wheels, at will.

4. The combination of a traction-wheel frame, a pair of traction wheels located on opposite sides of the axis thereof, a main frame having its front end supported on said traction-wheel frame and with relation to which the first-named frame may turn, a pair of rear wheels, a motor mounted on the main frame, means for communicating motion from the motor to a rear wheel, and means for communicating motion from the motor to one or both of the front wheels, at will.

5. The combination of a wheel frame, a wheel supporting the same, a main frame having its front end swiveled on said wheel-frame, wheels supporting the main frame in the rear of said wheel-frame, a motor mounted on the main frame, means for transmitting motion from the motor to one of said wheels, and means for transmitting motion from the motor to said wheel-frame for use in steering the machine.

6. The combination of a front wheel, a wheel-frame supported thereon, a main frame having its front end swiveled on said wheel-frame, a motor supported on the main frame, wheels supporting the main frame in the rear of said wheel-frame, means for communicating motion from the motor to one of said wheels, a shaft equipped with a sprocket-wheel and geared to said motor, and a sprocket-chain connected with said sprocket-wheel and with said wheel-frame, whereby the machine may be steered by power from the motor.

7. The combination of a front wheel and a wheel-frame supported thereon, a main frame having its front end swiveled on said wheel-frame, rear wheels for the main frame, and steering mechanism comprising a steering shaft geared to said wheel-frame, a locking device for said steering shaft, and power-actuated means for actuating said steering shaft.

8. The combination of a front wheel, a wheel-frame supported thereon, a main frame having its front end swiveled on said wheel-frame, wheels for the rear portion of the main frame, a motor mounted on the main frame, a shaft actuated therefrom, a steering shaft geared to said wheel-frame, means for locking said steering shaft, and mechanism for releasing the steering shaft and connecting it with said first-named shaft, whereby the machine may be steered by power.

9. The combination of a front wheel, a wheel-frame supported thereon, a main frame having its front end swiveled on said wheel-frame, wheels for the rear portion of the main frame, a motor mounted on the main frame, a shaft driven from said motor, a steering shaft geared to said wheel-frame and equipped with a transmission member, shiftable transmission members on the first-named shaft, a gripping device for the steering shaft, and means for releasing said gripping device and throwing either one of the transmission members on said first-named shaft into engagement with the transmission member on said steering shaft.

10. The combination of a front wheel, a wheel-frame supported thereon, a main frame having swivel connection with said wheel-frame, wheels for the rear portion of the main-frame, a motor mounted on the main frame, a continuously actuated shaft geared to the motor and equipped with shiftable friction disks, a steering shaft geared to said wheel-frame and equipped with a disk located between said first-named disks, a pair of slides, a cable connected with said slides and serving to control the steering shaft, and means for simultaneously actuating one of said first-named disks and one of said slides to release the steering shaft and set it in motion.

11. The combination of a front wheel, a wheel frame supported thereon, a main frame having its front end supported on said wheel-frame and free to turn with relation thereto, a standard supported on said wheel frame, a transverse shaft supported on said standard and geared to said wheel, a standard supported on the main frame and having swivel connection with said first-named standard, a vertical shaft geared to said first-named shaft, a shaft geared to said vertical shaft and supported on the second-named standard, wheels supporting the rear portion of the main frame, and a motor supported on the main frame and geared to said last-named shaft.

12. The combination of a pair of traction-wheels, a wheel-frame supported thereon, a standard supported on said wheel-frame, a transverse shaft above said wheels, clutch-controlled means for transmitting motion from said shaft to each of said wheels, a main frame having its front end swiveled on said wheel-frame, a shaft supported on said main frame and geared to said first-named shaft, wheels supporting the rear portion of the main frame, a motor supported on the main frame, and means for communicating motion from said motor to said second-named shaft, at will, for the purpose set forth.

13. The combination of a front wheel, a wheel-frame supported thereon, a main frame having its front end swiveled on said wheel-frame, a motor mounted on the main frame immediately in the rear of said wheel-frame, wheels supporting the rear portion of the main frame, a vertically adjustable tool-frame supported on the main frame, means for communicating motion from said motor to one of said wheels, a pair of parallel shafts geared together and connected with the tool-frame, and means for communicating motion from said motor to one of said shafts, at will.

14. The combination of a front wheel, a wheel-frame supported thereon, a main frame swivelly connected with said wheel-frame, wheels supporting the rear portion of the main frame, a vertically adjustable tool-frame, a shaft serving to raise the tool frame, a seeder connected with the tool-frame, a shaft serving to operate the seeder, a motor mounted on the main frame, and means for connecting said motor with either one of said shafts, at will.

15. In a machine of the character set forth, the combination with a main-frame, of a tool-frame, a pair of parallel shafts geared together, suspending means for the tool-frame connected with said shafts, means for actuating one of said shafts to raise the tool-frame, and means for gripping one of said shafts to lock the tool frame in a given position or to lower the tool frame under control, at will.

16. The combination of a front wheel, a wheel-frame supported thereon, a main frame swivelly connected with said wheel-frame, rear wheels supporting said main frame, a vertically adjustable tool-frame, and means carried by the main frame for imparting substantially horizontal draft to the tool-frame, regardless of the position of the tool-frame.

17. The combination of a front wheel, a wheel-frame supported thereon, a main frame swivelly connected with said wheel-frame, a pair of rear wheels for the main frame, a tool-frame, flexible means suspending the tool-frame from the main frame, and a depending member supported on the main frame and slidably engaging the front end portion of the tool-frame, whereby substantially horizontal draft is imparted to the tool-frame, regardless of the adjustment of the tool-frame.

18. The combination of a front wheel, a wheel-frame supported thereon, a main frame swivelly connected with said wheel-frame, wheels supporting the rear portion of the main frame, a bar having longitudinal pivotal connection with said main frame in the rear of said wheel-frame, a depending bracket carried by said bar, a tool-frame engaged by said bracket, flexible means suspending the tool frame from the main frame, and flexible means joining the extremities of said swiveled bar with said tool-frame near the front corners thereof.

19. The combination with a front wheel, a wheel-frame supported thereon, and a main frame comprising an upper member formed with a portion of a circle at its front end, and a lower member formed with a portion of a circle at its front end, connecting members joining said first-named members at their front ends, and axle brackets joined to said upper and lower members.

20. A main frame for a machine of the character set forth, comprising upper and lower frame members provided at their front ends with circular portions and having rearwardly extending side members joining said circular portions, and axle-brackets interposed between said side members, each axle-bracket having a channel for receiving a vertical portion of a bent axle.

21. The combination of a bent axle having vertical portions, and a main frame comprising upper and lower members, and axle-brackets interposed between said members, each bracket having an opening receiving a spindle of an axle and having on its inner face a channel receiving a vertical portion of the axle, for the purpose set forth.

THOMAS J. THORP.

In presence of—
A. U. THORIEN,
J. H. LANDES.